United States Patent [19]
Heizmann et al.

[11] Patent Number: 5,898,300
[45] Date of Patent: Apr. 27, 1999

[54] TRAVEL SENSOR HAVING APPROXIMATELY CONSTANT MEASURED SIGNAL TEMPERATURE DEPENDENCE ACROSS AN ENTIRE MEASUREMENT RANGE

[75] Inventors: Klaus Heizmann, Leonberg; Norbert Schneider, Tiefenbronn; Freidbert Roether, Cleebronn, all of Germany

[73] Assignee: Robert Bosch GmbH, Stuttgart, Germany

[21] Appl. No.: 08/887,210

[22] PCT Filed: Dec. 22, 1995

[86] PCT No.: PCT/DE95/01842

§ 371 Date: Jul. 2, 1997

§ 102(e) Date: Jul. 2, 1997

[87] PCT Pub. No.: WO96/21841

PCT Pub. Date: Jul. 18, 1996

[30] Foreign Application Priority Data

Jan. 14, 1995 [DE] Germany .......................... 195 00 982

[51] Int. Cl.[6] .......................... G01D 3/028; G01D 5/20; G01B 7/14
[52] U.S. Cl. ................... 324/207.12; 324/207.16; 324/207.24; 336/84 M; 336/130
[58] Field of Search ................ 324/207.12, 207.16, 324/207.18, 207.19, 207.22, 207.24, 236; 336/45, 84 M, 130, 136; 340/870.31–870.33

[56] References Cited

U.S. PATENT DOCUMENTS

| 3,891,918 | 6/1975 | Ellis ................................ 324/236 X |
| 4,667,158 | 5/1987 | Redlich .......................... 324/207.19 |
| 5,068,607 | 11/1991 | Redlich et al. .................. 324/207.16 |

FOREIGN PATENT DOCUMENTS

| 3109930A1 | 9/1982 | Germany . |
| 4020369A1 | 1/1992 | Germany . |

*Primary Examiner*—Gerard Strecker
*Attorney, Agent, or Firm*—Michael J. Striker

[57] ABSTRACT

A travel sensor (10) is proposed which has a insertion body (11) consisting of non-ferromagnetic material with good conductive properties. The insertion body (11) is submerged into a measuring coil (15) through which alternating current flows. In addition, the travel sensor is enveloped by a shielding sleeve (16) consisting of ferromagnetic material. Due to the alternating effect between the magnetic field of the coil (15), through which an alternating current flows, and the two materials, at designated frequencies of the alternating current and the respective volume of the insertion body (11) or the shielding sleeve (16), it is possible to compensate the effects of the temperature in such a way that at varying temperatures the measuring curves of the travel sensor (10) extend nearly parallel across the entire measuring range.

4 Claims, 1 Drawing Sheet

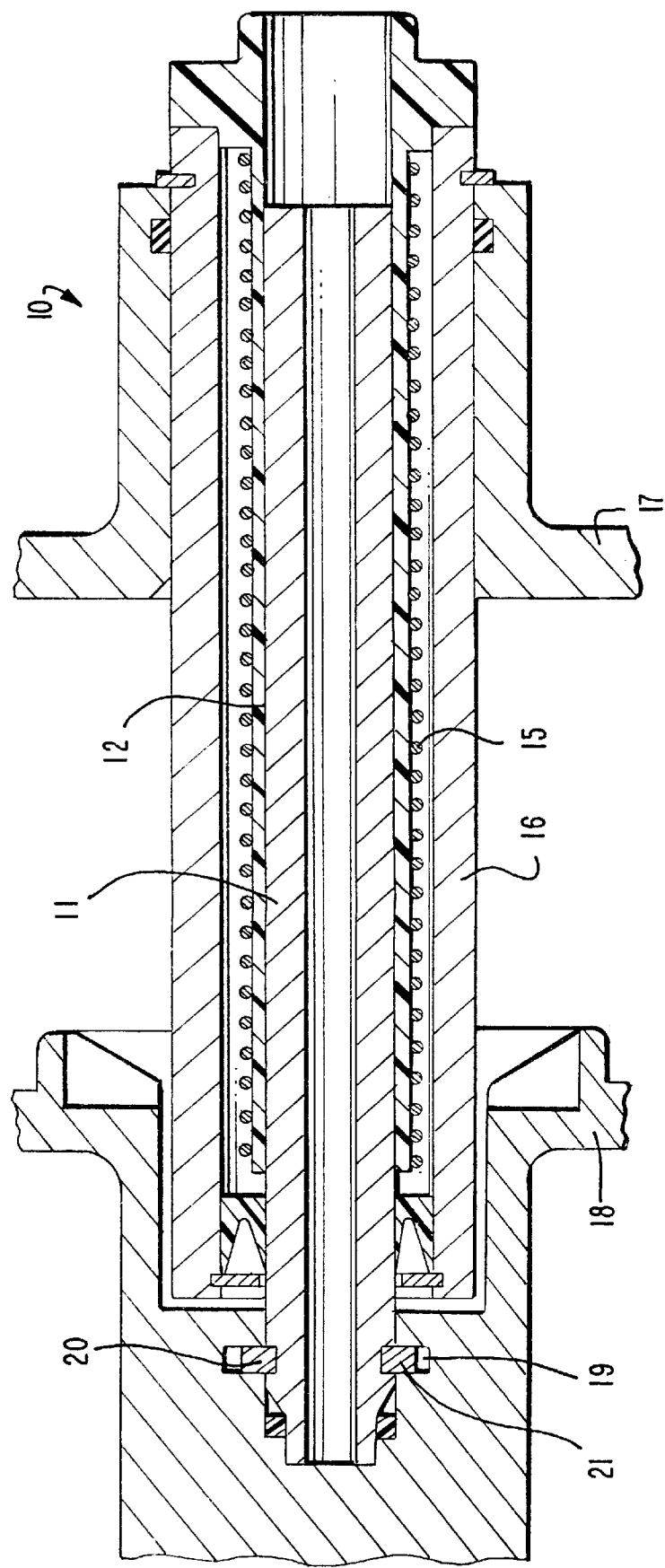

TRAVEL SENSOR HAVING APPROXIMATELY CONSTANT MEASURED SIGNAL TEMPERATURE DEPENDENCE ACROSS AN ENTIRE MEASUREMENT RANGE

BACKGROUND OF THE INVENTION

1. Field of the Invention

The present invention relates to a travel sensor and, more particularly, to a travel sensor for measuring a penetration depth of a body in a measuring coil through which an alternating current passes by measuring the damping of the alternating current.

2. Prior Art

From DE-OS 31 09 930.0 a travel sensor is known, in which the bar core with the exploring coil is inserted into a copper tubing attached inside a pipe. The frequency of the alternating current flowing through the coil is timed in such a way, that the eddy currents only develop in the copper surface. But the so-called eddy current principle used here has a low temperature dependency. However, at differing temperatures a temperature drift occurs which is a function of the depth of penetration of the insertion body into the exploring coil. In an electrical evaluation circuit this temperature drift can only be compensated with difficulty and requires a lot of time.

In the inductive travel sensor known from DE-OS 40 20 369.7 an insertion body is also moved in a measuring coil. In this case the insertion body consists of a layer of ferromagnetic and a layer of non-ferromagnetic material with good electrical conductivity properties. However, in practice it is very difficult to apply these two layers and to synchronize the two in order to avoid a temperature drift. For this reason the manufacture of this type of travel sensor is very time consuming, complicated and relatively expensive.

SUMMARY OF THE INVENTION

It is an object of the present invention to provide an improved travel sensor of the above-described type that avoids the above-mentioned disadvantages.

The travel sensor according to the invention includes at least one measuring coil through which an alternating current flows, a shielding sleeve enveloping the at least one measuring coil and consisting of a ferromagnetic material and an electrically conductive, non-ferromagnetic body arranged in the at least one measuring coil to extend into the at least one measuring coil (15) to a penetration depth which is moveable relative to the at least one measuring coil so that the penetration depth is variable. A measured signal characteristic of the penetration depth of the body in the at least one measuring coil is obtainable by measuring a damping of the alternating current. Respective volumes of the ferromagnetic material and the electrically conductive, but non-ferromagnetic, material are selected for a predetermined fixed eddy current frequency so that the temperature dependence of the measured signal is at least approximately constant across an entire measurement range for the measured signal.

In contrast, the travel sensor in accordance with the invention has the advantage, that the measuring curves determined at different temperatures run nearly parallel across the entire measuring range. Thus, the dependence of the temperature is nearly constant across the entire measuring range and can easily be considered in an electrical evaluation circuit. It is known that the offset variance of the measuring curve, i.e. the shift of the zero point, for example, can be relatively easily compensated with the aid of an electrical evaluation circuit. By using a shielding sleeve of ferromagnetic material, electromagnetic stray fields can be shielded, which for example are caused by electromagnets located close to the travel sensor. The ferromagnetic properties of the sleeve thus only have a minimal effect on the inductivity of the coil through which electricity flows, since on their way the lines of flux of the magnetic field of the coil are concentrated in the sleeve. The magnetic flow is thus independent of the other geometric properties of the travel sensor or of possible exterior interference fields.

The manufacture of the travel sensor is particularly easy, since only the thickness of the insertion body and of the exterior sleeve and the frequency must be synchronized.

In a preferred embodiment of the invention the measuring coil is arranged on a coil body consisting of non-ferromagnetic material with poor conductivity.

BRIEF DESCRIPTION OF THE DRAWING

An exemplary embodiment of the invention is shown in the drawing and described in more detail in the following description. The only drawing figure shows a sectional view through a travel sensor according to the invention.

DESCRIPTION OF THE PREFERRED EMBODIMENTS

In the drawing figure, a travel sensor is identified by 10, comprising an insertion body 11 guided nearly without friction in a coil body 12 consisting of non-ferromagnetic electrical material with poor conductivity, for example plastic or austenitic steel. The insertion body 11 consists of a pipe consisting of non-ferromagnetic material with good conductivity properties, for example aluminum. The penetration depth of the insertion body 11 into the coil body 12 corresponds to the displacement or travel to be measured. The drawing figure shows the insertion body 11 in a completely inserted state. A measuring coil 15 is wound on the coil body 12, i.e. on the side turned away from the insertion body 11. This measuring coil 15 can be wound in several layers. A shielding sleeve 16 is arranged over the measuring coil 15. The shielding sleeve 16 consists of ferromagnetic material. In addition to the prior functions, as for example to protect the measuring coil 15 from contamination because of environmental effects and from external electromagnetic fields, the shielding sleeve 16 also serves to affect a measured signal. The shielding sleeve 16 extends into two housing parts 17, 18, whose distance or whose relative change of distance to each other is to be determined. The one housing part 17 is firmly arranged in place and is attached to the shielding sleeve 16 with the aid of flange-like extensions. The other housing part 18 is movable, but firmly attached to the insertion body 11. To this end, annular grooves 19 and 20 are respectively formed in housing part 18 and in insertion body 11, in which which is engaged a holding ring 21. The insertion body 11 is thus moved along in accordance with the displacement of the housing part 18. The travel sensor 10 can be used with a pneumatic or hydraulic element, wherein the insertion body 11 is then embodied as the piston rod of the piston and the coil body as a hydraulic cylinder. For example its use can be intended with a clutch plate.

First the individual measuring effects will be explained that could later appear on the sleeve or on the pipe, if the respectively other part were not provided. If an alternating current flows through the coil 15 and the magnetic alternating field of the coil only picks up a non-ferromagnetic material with good conductive properties, i.e. only the insertion body 11 would be picked up by the magnetic alternating field of the coil 15, the so-called eddy current effect alone would be at work. Because of the eddy currents developing in the non-ferromagnetic material with good electrical conductivity, a reduction of the inductivity of the measuring coil 15 results, so that the strength of the applied measuring voltage U decreases. The deeper the material, i.e. the insertion body 11, penetrates into the measuring coil 15, the greater is the formation of the eddy current, since more volume becomes available. In this case a measuring curve for voltage range U at penetration depths with a negative rise would be obtained. At different temperatures the rise of the measuring curve varies. But the effect of temperature over the entire measuring range varies. The deeper the insertion body 11 penetrates into the measuring coil 15, the greater are the variances of the measured signals from the calibration curve. This measuring error, which now occurs because of temperature variance is not directly proportionate to the penetration depth s and thus can only be compensated with difficulty in an evaluation circuit.

A description of the effect of the magnetic field of the coil, through which an alternating current flows, on the ferromagnetic material situated on the opposite side, i.e. on the shielding sleeve 16, follows here. With this alternating effect the embodiment is based on the so-called ferromagnetic or inductive effect. The magnetic alternating field of the coil through which alternating current flows picks up the surface of the ferromagnetic material. It should be pointed out, that the ferromagnetic as well as the eddy current effect operates in ferromagnetic material. While the eddy current effect causes a reduction of the inductivity of the measuring coil, the ferromagnetic effect causes an increase of its inductivity. The frequency of the eddy current which flows through the coil 15 primarily determines which of the two effects dominates. Although the permeability of ferromagnetic material is temperature-dependent, the effect on the inductivity of the coil is only minimal. This depends on the disposition of the shielding sleeve 16 in relation to the coil. The temperature dependency of the specific resistance of the ferromagnetic shielding sleeve 16 also effects the inductivity of the coil.

In order to optimize the sensitivity of the temperature curve of the inductive travel sensor, the temperature dependency of the eddy currents that flow through the insertion body 11 induced by the electrically conductive but non-ferromagnetic material, must have a counter-effect on the shielding sleeve 16 made of ferromagnetic material. As a function of the frequency of the alternating current that flows through the coil 15 and the electrical conductivity of the material of the insertion body 11, the penetration depth of the eddy currents into the surface of the insertion body 11 varies (analogous effect). At the selected low frequency range between 5 to 20 kHz, not only the surface is penetrated by the eddy currents, but the total volume of the insertion body 11 becomes the deciding factor. The volume variation can be achieved, in that the thickness of the walls of a pipe or the diameter of a compact device is selected accordingly. Since the frequency of the alternating current has to be maintained constant, the developing eddy currents, aside from the penetration depth of the submersion body, are only dependent on the electrical conductivity of the material of the insertion body 11. The wall thickness, i.e. the volume of the insertion body 11 thus has to be selected in such a way, that the variance of the electrical resistance which determines the current flow of the eddy currents, counters the temperature effect of the shielding sleeve 16. The thickness of the material of the insertion core 11 thus has to be selected in such a way, that the variance of the electrical resistance, which determines the power flow of the eddy currents, counters the temperature effect which is created by the ferromagnetic material of the shielding sleeve 16. At an alternating current frequency of 8 to 15 kHz, the thickness of the shielding sleeve 16 fluctuates between 2 to 5 mm. If the insertion body 11 is embodied as a sleeve, the sleeve 16 has a wall thickness of 1.8 to 5 mm. If a solid body is used as the insertion body 11, these specifications would have to be changed accordingly. Of particular advantage is the use of a sleeve 16 consisting of steel with a thickness of 3 mm, and a sleeve-like submersion body 11 with a wall thickness of 2.5 mm consisting of aluminum at a frequency of the alternating current of 11.6 kHz. Because of this synchronization, the respective measuring curves extend parallel at different temperatures.

We claim:

1. A travel sensor (10) comprising at least one measuring coil (15) through which an alternating current flows;

a shielding sleeve (16) enveloping the at least one measuring coil (15) and consisting of a ferromagnetic material; and an insertion body (11) arranged in said at least one measuring coil (15) to extend into said at least one measuring coil (15) up to a penetration depth and moveable relative to the at least one measuring coil (15) so that the penetration depth is variable, said insertion body (11) consisting of an electrically conductive, but non-ferromagnetic material;

so that a measured signal (U) characteristic of said penetration depth is obtainable by measuring a damping of said alternating current; and wherein respective volumes of said ferromagnetic material and said electrically conductive, but non-ferromagnetic, material are selected for a predetermined fixed eddy current frequency so that a temperature dependence of said measured signal (U) is at least approximately constant across an entire measurement range for said measured signal.

2. The travel sensor as defined in claim 1, wherein the insertion body (11) is a pipe with a pipe wall having a thickness of from 1.8 to 5 mm, the shielding sleeve (16) has a shielding sleeve wall having a thickness of from 2 to 5 mm and the alternating current has a frequency of between 8 to 15 kHz.

3. The travel sensor as defined in claim 1, wherein the thickness of the shielding sleeve wall is 3 mm, the thickness of the pipe wall of the insertion body (11) is 2.5 mm, shielding sleeve wall consists of steel, the insertion body (11) is made of aluminum and the frequency of the alternating current is 11.6 kHz.

4. The travel sensor as defined in claim 1, further comprising a coil body (12) consisting of non-ferromagnetic material having a poor electrical conductivity and wherein the at least one measuring coil (15) is arranged on the coil body (12).

\* \* \* \* \*